US011376605B2

(12) United States Patent
Pernia

(10) Patent No.: US 11,376,605 B2
(45) Date of Patent: Jul. 5, 2022

(54) PERSONAL PLASTIC BOTTLE SHREDDER

(71) Applicant: Ramon Elias Pernia, Eagle Mountain, UT (US)

(72) Inventor: Ramon Elias Pernia, Eagle Mountain, UT (US)

(*) Notice: Subject to any disclaimer, the term of this patent is extended or adjusted under 35 U.S.C. 154(b) by 197 days.

(21) Appl. No.: 16/677,429

(22) Filed: Nov. 7, 2019

(65) Prior Publication Data

US 2021/0138479 A1     May 13, 2021

(51) Int. Cl.
*B02C 18/18* (2006.01)
*B02C 19/00* (2006.01)
*B29B 17/04* (2006.01)

(52) U.S. Cl.
CPC ........ *B02C 18/182* (2013.01); *B02C 19/0093* (2013.01); *B29B 17/0412* (2013.01); *B29B 2017/0452* (2013.01)

(58) Field of Classification Search
CPC . B02C 18/182; B02C 18/188; B02C 19/0093; B02C 19/0081; B29B 17/04; B29B 17/0412; B29B 17/02; A47J 43/04
USPC ........... 241/168, 169.1, 199.12, 285.3, 199.7
See application file for complete search history.

(56) References Cited

U.S. PATENT DOCUMENTS

| | | | | |
|---|---|---|---|---|
| 61,424 A * | 1/1867 | Haven | ................... | B02C 13/282 241/285.3 |
| 234,478 A * | 11/1880 | Hbner | ................... | B02C 13/282 241/285.3 |
| 3,419,223 A * | 12/1968 | Morin | ..................... | B02C 18/16 241/73 |
| 3,610,304 A * | 10/1971 | Popeil | ..................... | B26D 1/29 241/92 |
| 4,073,444 A * | 2/1978 | Pav | ....................... | B02C 18/144 241/241 |
| 4,385,732 A * | 5/1983 | Williams | ............ | B02C 18/0084 241/236 |
| 5,125,333 A * | 6/1992 | Gourley, III | ........ | B02C 19/0081 100/102 |
| 5,213,272 A * | 5/1993 | Gallagher | ................ | B30B 9/30 241/33 |
| 5,513,810 A * | 5/1996 | Lin | ........................ | B26D 3/225 241/95 |
| 6,070,819 A * | 6/2000 | Young | .................. | B02C 13/095 241/189.1 |

(Continued)

*Primary Examiner* — Faye Francis
(74) *Attorney, Agent, or Firm* — Lyman H. Moulton, Esq.; Moulton Patents, PLLC

(57) ABSTRACT

A plastics recycling preparation container canister includes a stationary disc configured with cutting teeth disposed on an axial surface thereof, the stationary disc disposed substantially orthogonal to an underside of a hinged lid for the container. The container canister also includes a spinning disc configured with cutting teeth disposed on an axial surface thereof, the spinning disc disposed on a sidewall of the container. A ramp for directing plastics to be shredded to the spinning disc is implemented followed by the stationary disc swung into a parallel position to the spinning disc in a sandwich configuration around the plastics to be shredded. The stationary disc and the spinning disc are separated by a space to accommodate the respective cutting teeth thereof and a space for shards of the plastic consumer recyclable. The cutting teeth of both discs are shaped like a parrot's beak having a rhinotheca tomium cutting surface.

7 Claims, 9 Drawing Sheets

(56) References Cited

U.S. PATENT DOCUMENTS

| | | | | |
|---|---|---|---|---|
| 7,374,115 B2* | 5/2008 | Geiger | ............... | B02C 17/18 |
| | | | | 241/171 |
| 7,422,167 B2* | 9/2008 | Olson | ............... | B02C 19/061 |
| | | | | 241/285.3 |
| 7,735,763 B2* | 6/2010 | Bell | ............... | A61J 7/0007 |
| | | | | 241/169.1 |
| 10,906,143 B2* | 2/2021 | Sears | ............... | B02C 18/182 |
| 2008/0277513 A1* | 11/2008 | Holcomb | ............... | A47J 43/1081 |
| | | | | 241/169.1 |
| 2009/0294563 A1* | 12/2009 | Yamashita | ............... | B02C 18/146 |
| | | | | 241/221 |
| 2013/0092768 A1* | 4/2013 | Feichtinger | ............... | B29B 17/02 |
| | | | | 241/20 |
| 2013/0168201 A1* | 7/2013 | Hackl | ............... | B65G 11/206 |
| | | | | 193/2 R |
| 2016/0135647 A1* | 5/2016 | Repac | ............... | A47J 43/082 |
| | | | | 241/169.1 |
| 2017/0259273 A1* | 9/2017 | Cottam | ............... | B02C 7/04 |
| 2018/0214887 A1* | 8/2018 | Daniken | ............... | B02C 18/182 |

* cited by examiner

PERSONAL PLASTIC BOTTLE SHREDDER

BACKGROUND OF THE INVENTION

Field of Invention

The present invention relates to a Personal Rotary Disk Plastic Bottle Shredder.

Description of Related Art

Broadly, there are two major ways to recycle plastic bottles and plastic bags. Mechanical recycling, also known as "chop and wash" is where the plastic is washed, ground into powders and melted. Chemical recycling is where the plastics are broken down into basic components. Before recycling, most plastics are sorted according to their resin type. In the past, plastic reclaimers used the resin identification code (RIC), a method of categorization of polymer types, which was developed by the Society of the Plastics Industry in 1988.

Polyethylene terephthalate, commonly referred to as PET, for instance, has a resin code of 1. Most plastic reclaimers do not rely on the RIC now; they use various sorting systems to identify the resin, ranging from manual sorting and picking of plastic materials to mechanized automation processes that involve shredding, sieving, separation by rates of density i.e. air, liquid, or magnetic, and complex spectrophotometric distribution technologies e.g. UV/VIS, NIR, Laser, etc.[12] Some plastic products are also separated by color before they are recycled.

After sorting, for mechanical recycling the plastic recyclables are then compressed and cut. These cut fragments then undergo processes to eliminate impurities like paper labels. This material is melted and often extruded into the form of pellets which are then used to manufacture other products. The highest quality purification may be referred to as "regeneration".

SUMMARY OF THE DISCLOSURE

A plastics recycling preparation device comprises a stationary disc configured to define an opening for a plastic consumer recyclable to pass there through, the stationary disc configured with cutting teeth disposed on an axial surface of the stationary disc. The device also includes a spinning disc configured with cutting teeth disposed on a axial surface thereof facing the cutting teeth of the stationary disc, the spinning disc oriented orthogonally to a passage of the plastic consumer recyclable through the stationary disc onto the spinning disk, wherein the stationary disc and the spinning disc are separated by a space configured to accommodate the respective cutting.

A plastics recycling preparation container canister includes a stationary disc configured with cutting teeth disposed on an axial surface thereof, the stationary disc disposed substantially orthogonal to an underside of a hinged lid for the container. The container canister also includes a spinning disc configured with cutting teeth disposed on a axial surface thereof, the spinning disc disposed on a sidewall of the container. A ramp for directing plastics to be shredded to the spinning disc is implemented followed by the stationary disc swung into a parallel position to the spinning disc in a sandwich configuration around the plastics to be shredded. The stationary disc and the spinning disc are separated by a space configured to accommodate the respective cutting teeth thereof and a space for shards of the plastic consumer recyclable.

A plastics recycling preparation method includes providing a stationary disc configured to define an opening for a plastic consumer recyclable to pass there through, the stationary disc configured with cutting teeth disposed on an axial surface of the stationary disc. The method also includes a spinning disc configured with cutting teeth disposed on a axial surface thereof facing the cutting teeth of the stationary disc, the spinning disc oriented orthogonally to a passage of the plastic consumer recyclable through the stationary disc onto the spinning disk. The method further includes creating shreds of the plastic consumer recyclable passing through the stationary disc to the spinning disc separated by a space configured for shredding via the respective cutting teeth for shreds to pass there through.

Other aspects and advantages of embodiments of the disclosure will become apparent from the following detailed description, taken in conjunction with the accompanying drawings, illustrated by way of example of the principles of the disclosure.

Figure 1:
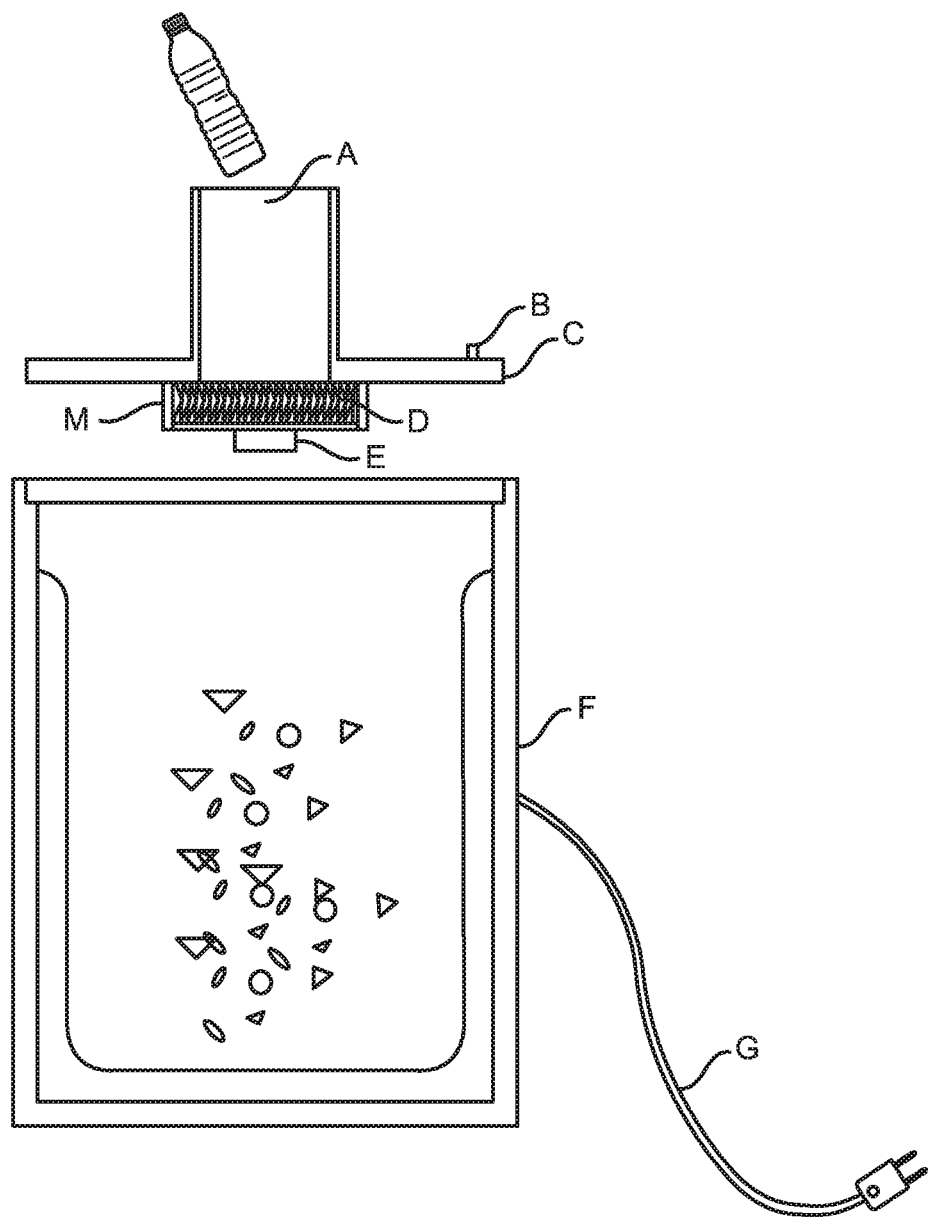
FIG. 1 is a cut away view of a lid mount personal plastic bottle shredder in accordance with an embodiment of the present disclosure.

Throughout the description, same and similar reference numbers may be used to identify same and similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The present disclosure consists of a container where you introduce a bottle or plastic bag and cut it into small pieces completely destroying the plastic container. It has the appearance of a garbage container with a circular hole in the lid with sufficient circumference to introduce a bottle of water or soda. It can also destroy larger containers such as gallons by lifting the lid and entering the container; since when you close the lid, the container is trapped between two blades, and when the blades spin, they destroy whatever is caught in between them. It works by means of a small 110 volt motor connected to a disk with sharp blades in the shape of a parrot's beak that can easily cut the plastic. This rotating disk is faced with another similar but static disk against it which cuts all plastic containers passing between the blades. It is made of two metal discs with blades in their flat parts; one of the discs is connected to a small electric motor of 110 volts, which is enough to make it spin with speed and force to cut the containers.

The disclosure consists of a container where you introduce a bottle or plastic bag and cut it into small pieces completely destroying the plastic container. It has the appearance of a garbage container with a circular hole in the lid with sufficient circumference to introduce a bottle of water or soda. It can also destroy larger containers such as gallons by lifting the lid and entering the container; since when you close the lid, the container is trapped between two blades, and when the blades spin, they destroy whatever is caught in between them. It works by means of a small 110 motor connected to a disk with sharp blades in the shape of a parrot's beak that can easily cut the plastic. This rotating disk is faced with another similar but static disk against it which cuts all plastic containers passing between the blades. It is made of two metal discs with blades in their flat parts; one of the discs is connected to a small electric motor of 110 volts, which is enough to make it spin with speed and force to cut the containers.

There are some plastic recycling machines that work by crushing the plastic, which requires high voltage to move the gears through where the plastic passes. In contrast, my idea is to cut the plastic into small pieces because the plastic is very easy to cut but not to grind, so it does not require large machines or high voltage to destroy it. The disclosure consists of two metal discs like those used in wood cutting saws, one of which will be attached to a small motor of 110 volts, like in a drill or blender, and the other will be fixed, but both discs will have several blades in their surfaces, which would be shaped like a parrot beak.

A space between the discs prevents the blades from clashing with the disc or when they face each other, which causes a cutting effect that would destroy any plastic object that stands between them. These two discs are the main part of the disclosure, the rest is architecture. An embodiment of the design is installed inside a container that can destroy and recycle the material destroyed simultaneously. Embodiments of the container where the discs are mounted or installed should have two entries for two different types or sizes. One should have a cylindrical shape to introduce the bottles and bags there and a larger one so that when you lift the lid you can add larger containers, such as a water ram.

One of the rotating discs must be against the back wall of the trash bin and the other, which does not rotate, must be attached to the lid so that it moves away or approaches the other disc, depending on whether the cover of the garbage post similar to the blue bins in many homes. A container exclusively for business includes a cylindrical entry on the lid to dispose of only plastic bottles and bags. These could be placed next to all the vending machines or refrigerators of the markets, stores or gas stations.

In addition, the latest regulations to protect the environment in the United States and in Europe enable the disclosure to procure a world without plastic waste. Although the problem is that there is no specific mechanism that allows the consumer to destroy the plastic every time he acquires a product, since almost everything comes packaged or contained in plastic. Some industrial recycling machines are very different from the disclosure which consists basically of creating a small plastic destroyer that is stored at home, and can destroy all those products that come wrapped or packaged in plastic, such as bottles and bags.

There is nothing like the disclosure which can destroy plastic containers both in one's home and in a business. There are only commercial and industrial recycling machines of large sizes which require high voltage of 220. The disclosure can easily work with a small drill motor or 110 volts because it does not crush the plastic, but rather cuts small pieces that fall to the bottom of the container to be stored in a large bag until it is filled and then easily disposed. The idea is that the act of recycling is easy and even fun. The disclosure gets people to stop throwing away plastic where it will not be easy to collect and quickly achieve an environment without plastic. On the other hand, the disclosure does not use gears to crush the plastic, but uses two facing discs whose faces have sharp parrot-beak-type blades that cut into small pieces any plastic container that passes between them.

The disclosure can be easily implemented in a blue recycle trash can because it only requires some adaptations to make it functional and safe. The disclosure eliminates the environmental pollution produced by the use of plastic by offering an easy way to destroy it from our own homes, reducing most of the containers we buy with everyday products to small pieces that are easy to recycle. It is ideal to adjust the expectations of large bottlers to efficiently recycle the plastic and thus comply with the regulations that are being imposed and those that will have to comply in a short time, as in California for example.

Many people do not recycle due to laziness, and they do not have at hand an ideal and easy way to destroy the plastic container that has remained in their hands after consuming their contents, especially if they are in the street, they only throw it into the ordinary garbage with all kinds of organic waste or different materials, which are very hard to separate later. This problem would be solved very easily if in each store, market, business, or gas station there would be an easy, and accessible way of disposing/destroying the plastic before one's very eyes, to later be reused or recycled.

Supermarkets such as Walmart and others that use millions of plastic bags daily would be very costly and impractical for them to use any other type of bag that is not disposable plastic. Bottlers of soft drinks such as Coca-Cola or Pepsi can also use the disclosure. Cities worried about pollution like Los Angeles Calif., among others and environmentalists want to prohibit the use of plastic as if it were the problem. In reality, plastic is one of the materials that most humans use and benefit from. The question is how to pick it up efficiently after using it to process it again and give it a new use. The disclosure solves that problem by giving people an ideal and easy way to destroy their own plastic immediately, efficiently and safely, either at home or in a business where they drink a simple bottle of mineral water.

FIG. 1 is a cut away view of a lid mount personal plastic bottle shredder in accordance with an embodiment of the present disclosure. The depiction includes an opening or aperture A, a power button B, a lid C, the grinding or shredding discs D, the 110 volt motor E, the container or canister F and the power cord G. Also, a debris ring M collects plastic shreds from the shredding discs or wheels and at the same time prevents the shredded plastic from flying in all directions. The debris ring may be a partial circumference catch ring or it may be a full circumference ring depending on a vertical or horizontal placement and a fall path for the plastic shredded debris.

Figure 2:
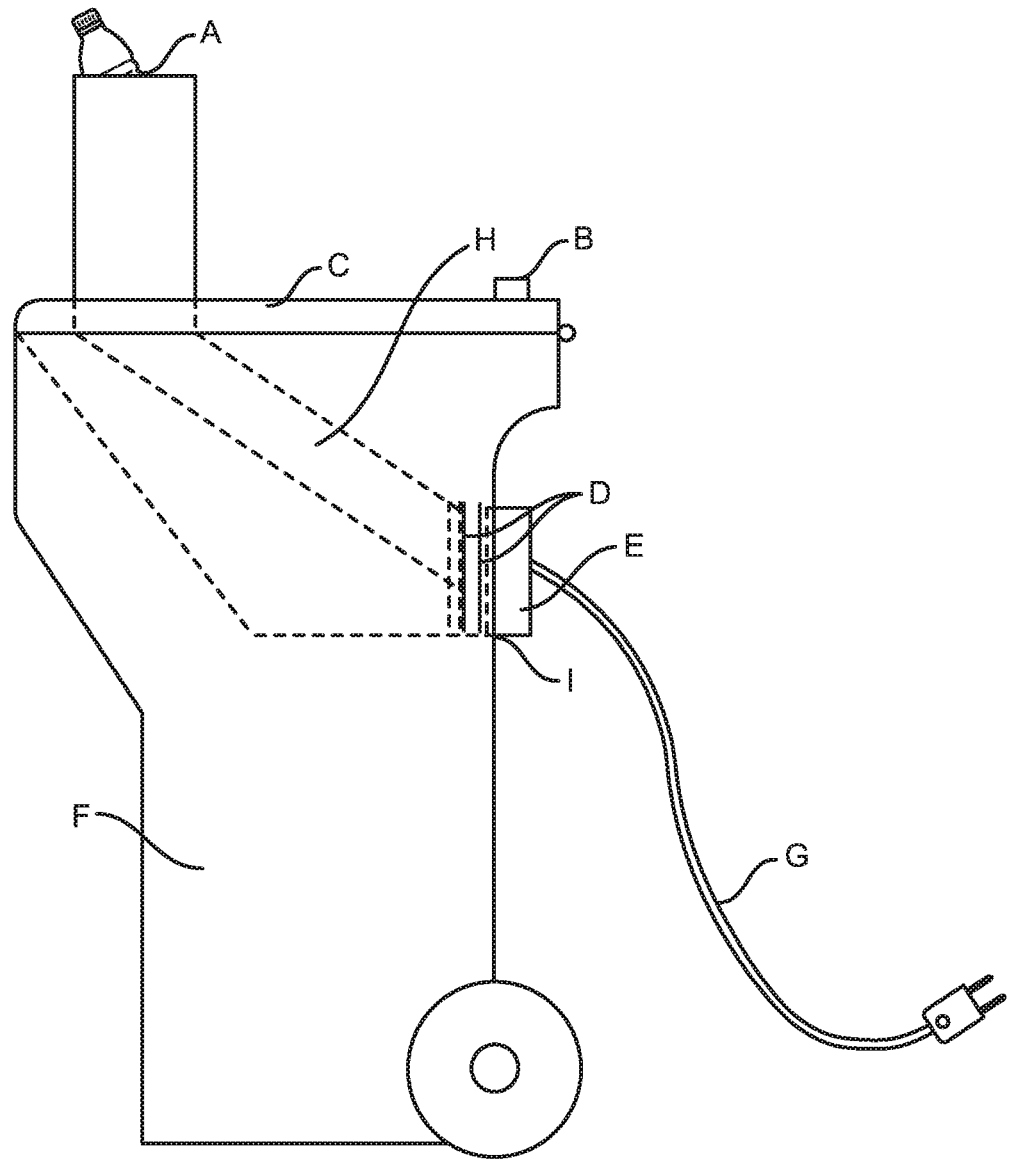
FIG. 2 depicts a side view of a closed hinge mounted personal plastic bottle shredder in accordance with an embodiment of the present disclosure.

FIG. 2 depicts a side view of a closed hinge mounted personal plastic bottle shredder in accordance with an embodiment of the present disclosure. The depiction includes aspects and references of FIG. 1 with some embodiments. For example, the grinding discs D are mounted on a sidewall of the canister or recycle can rather than on an underside of the lid. Additionally, the ramp or tube H channels and directs the plastic bottles and bags to the shredding and grinding discs D. A safety disc cover I is available for the spinning disc for safety in maintenance, transportation and storage.

Figure 3:
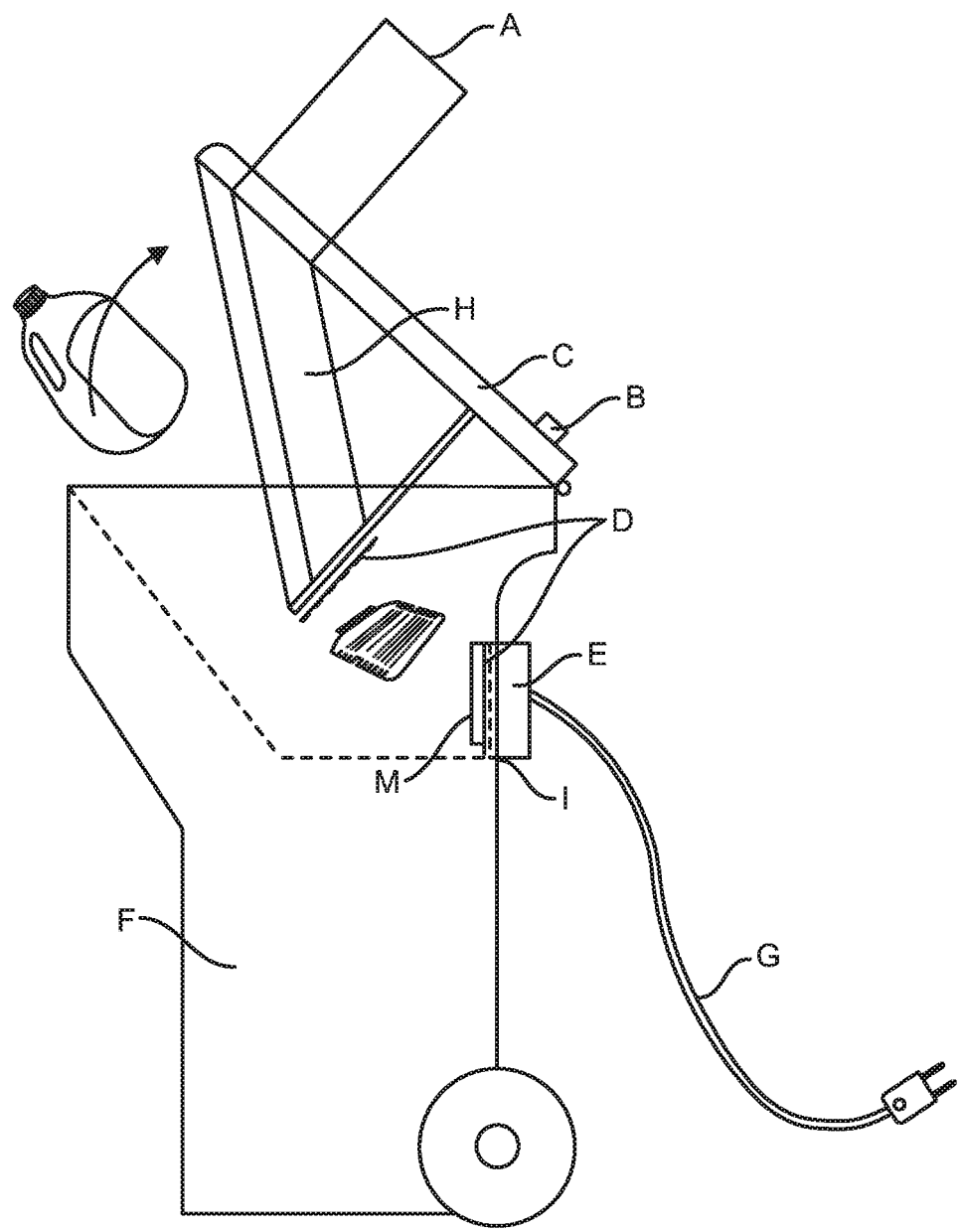
FIG. 3 depicts a side view of an opened hinge mounted personal plastic bottle shredder in accordance with an embodiment of the present disclosure.

FIG. 3 depicts a side view of an opened hinge mounted personal plastic bottle shredder in accordance with an embodiment of the present disclosure. The depiction includes aspects and references of FIG. 1 and FIG. 2 but in an open lid configuration to accommodate larger plastic containers, jugs and larger plastic bags. The stationary shredding disc is kept orthogonal to the lid by means of a mount and therefore swings out of the way for the larger items to be moved adjacent the spinning and shredding disc mounted on a sidewall of the container canister. The debris ring M is a partial circumference catch ring in order for shredded plastic debris to fall from the discs into the canister drum container.

Figure 4:
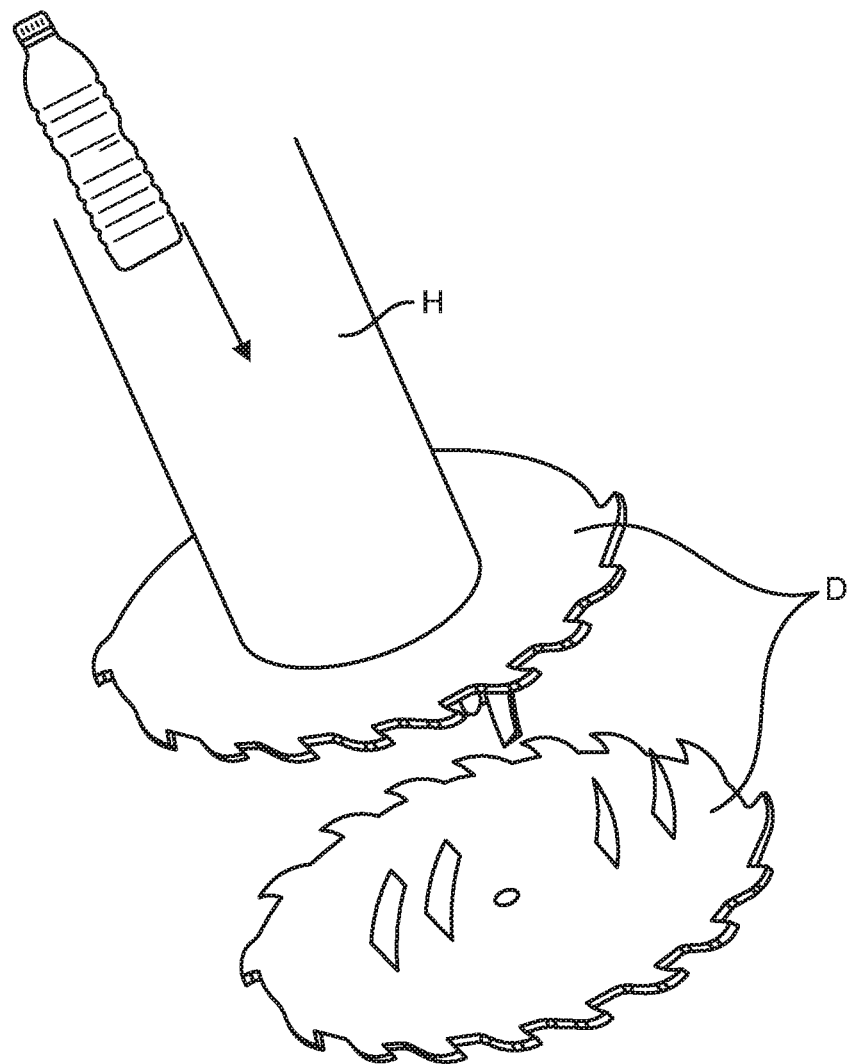
FIG. 4 depicts a detail of the shredding discs of the personal plastic bottle shredder in accordance with an embodiment of the present disclosure.

FIG. 4 depicts a detail of the shredding discs of the personal plastic bottle shredder in accordance with an embodiment of the present disclosure. The static disc shown in this image depicts the duct H located in the center of the disc where embodiments locate H to one side of the center as shown in other drawings herein. Since the first stationary disc does not need a rotational spindle, the orifice K through the disc provides throughput for plastic items to the bird's beak sharp edges. A guiding tube H directs the plastics to the discs D.

Figure 5:
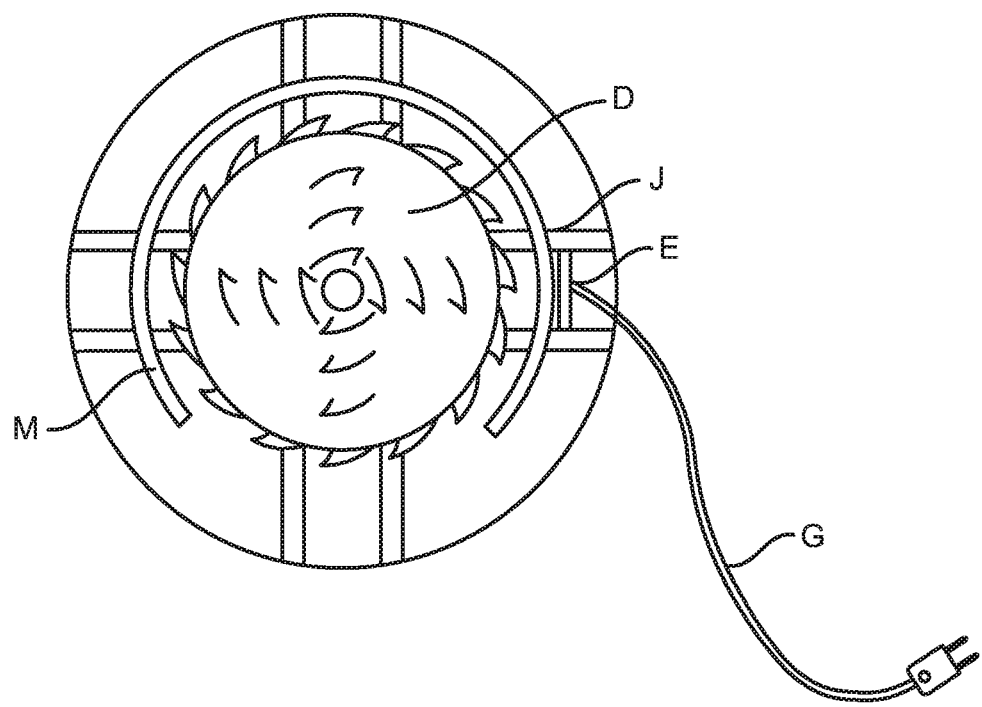
FIG. 5 depicts a top view of the spinning shredding disc mounted in a canister in accordance with an embodiment of the present disclosure.

FIG. 5 depicts a top view of the spinning shredding disc mounted in a canister in accordance with an embodiment of the present disclosure. The rotating disc is surrounded by a ring in embodiments to prevent pieces of plastic from jumping on all sides since both discs make a sandwich effect inside the container containing them. This prevents plastic coming out from all directions as it would otherwise in a blender when blades do not tumble inside a container. The depiction includes a top view of the shredding and grinding discs D, the metal frame providing a secure motor mount and other aspects common to aforementioned drawings. This canister embodiment simplifies the method and process of preparing the plastics for recycle or for disposal to recycle bins. The debris ring M is depicted in a partial circumference to allow shredded plastic debris to exit and collect within a trap or the housing of the container.

Figure 6:
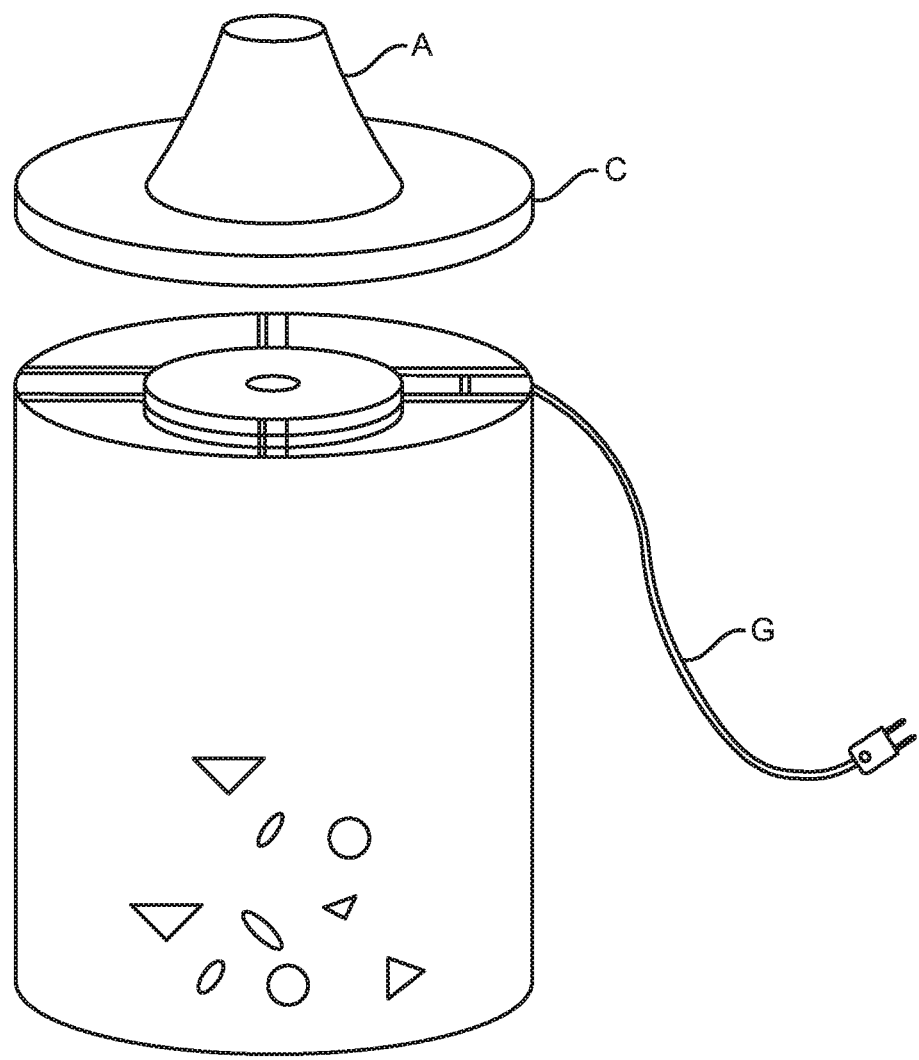
FIG. 6 depicts an open perspective view of the canister mount personal plastic bottle shredder in accordance with an embodiment of the present disclosure.

FIG. 6 depicts an open perspective view of the canister mount personal plastic bottle shredder in accordance with an embodiment of the present disclosure. The opening A restricts bottle size but flanges outward near the lid to provide area for shredding operation. The canister collects the shredded pieces and may be bagged or channeled via vacuum to other processing.

Figure 7:
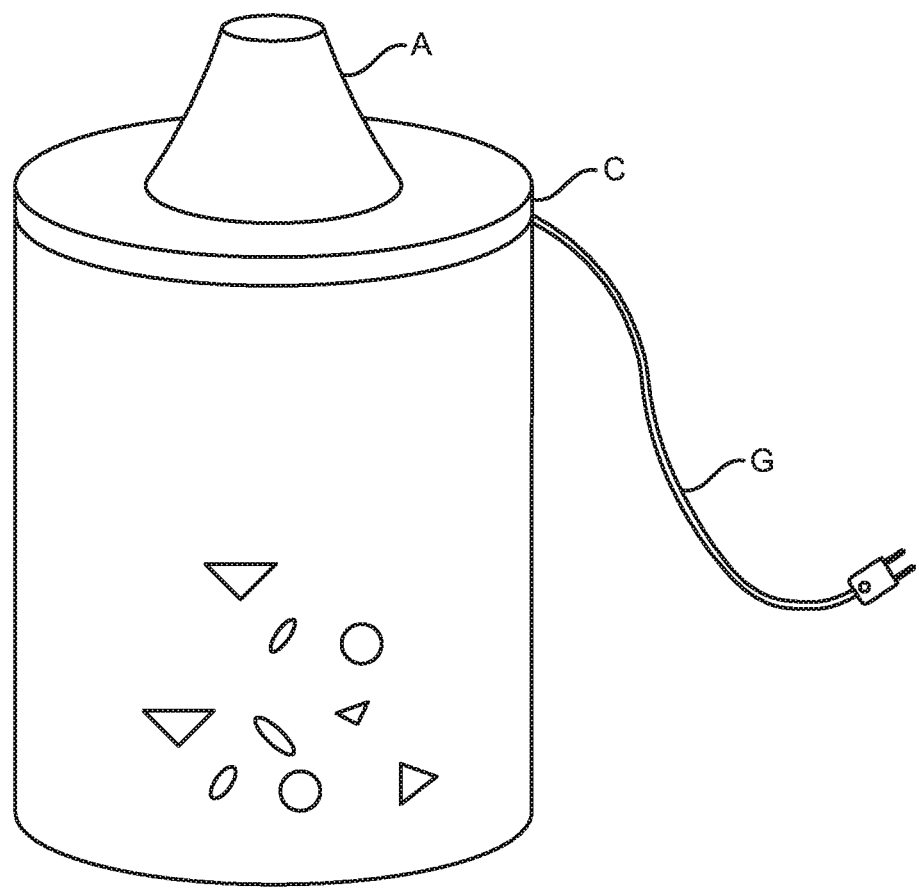
FIG. 7 depicts a closed perspective view of the canister mount personal plastic bottle shredder in accordance with an embodiment of the present disclosure.

FIG. 7 depicts a closed perspective view of the canister mount personal plastic bottle shredder in accordance with an embodiment of the present disclosure. This simplified embodiment is most practical for home use without sacrificing any of the functional aspects of the disclosure.

Figure 8:
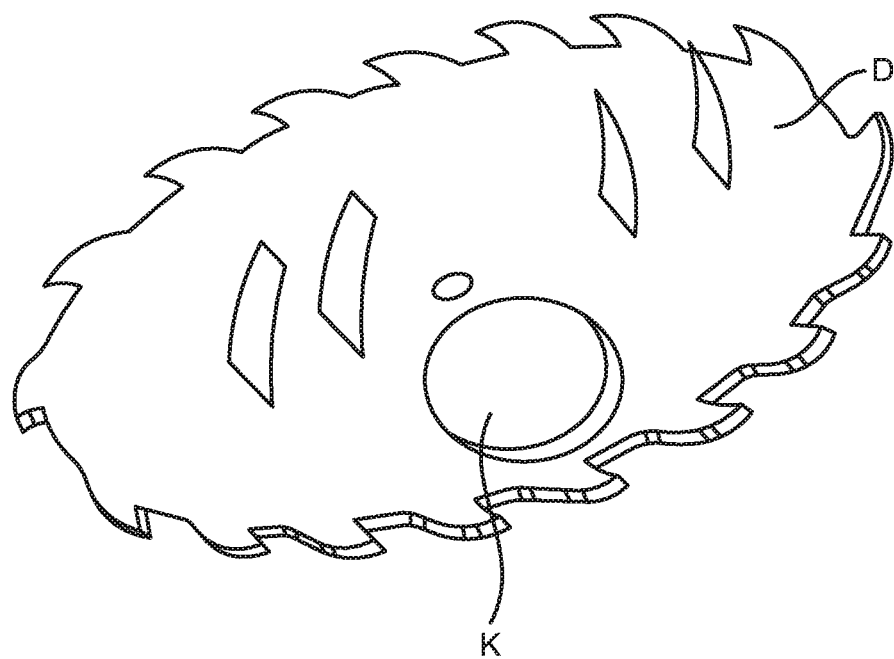
FIG. 8 depicts a close up of the shredding and grinding discs including an opening for the plastics to have access to the shredding blades of the spinning disc.

FIG. 8 depicts a close up of the shredding and grinding discs including an opening for the plastics to have access to the shredding blades of the spinning disc. The cutting teeth of the spinning disc and the cutting teeth of the stationary disc both comprise cutting blades in the shape of a parrot's beak comprising a rhinotheca tomium cutting surface as shown and disclosed.

Figure 9:
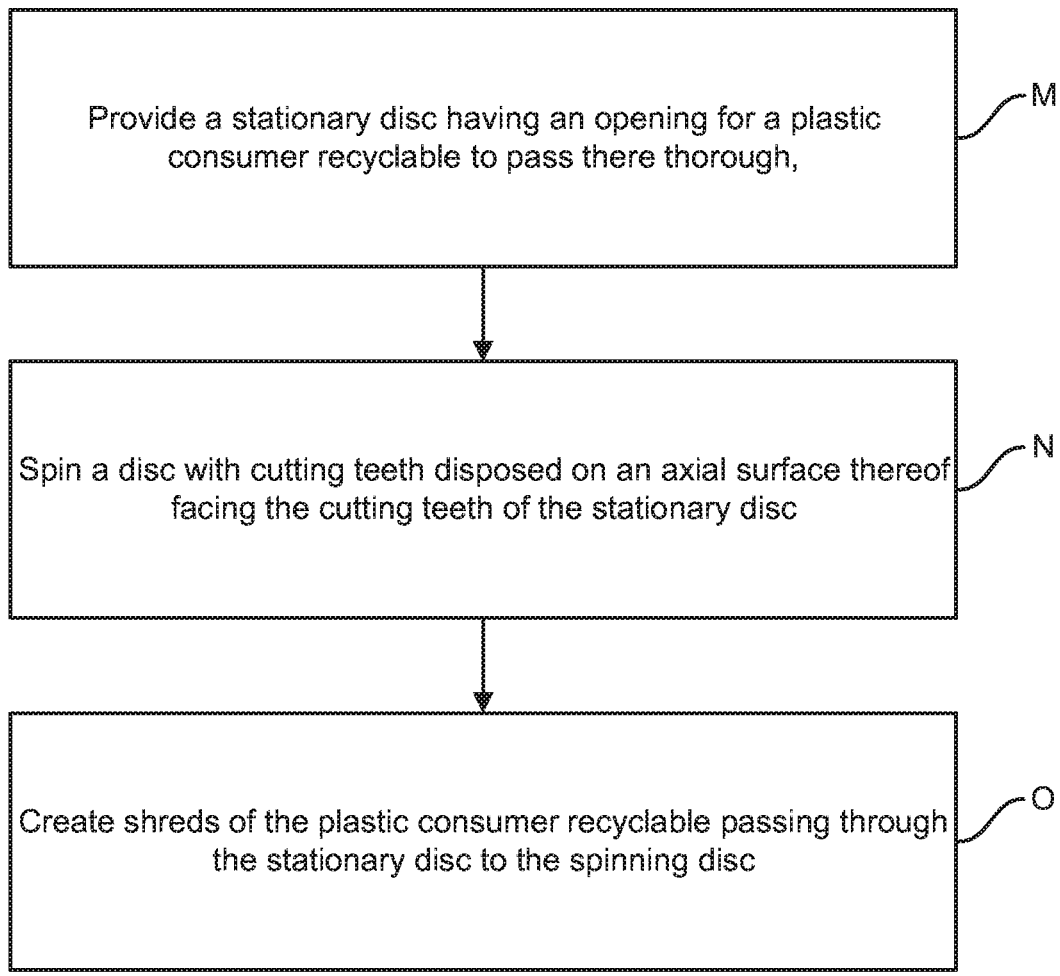
FIG. 9 depicts a method of preparing plastic bottles and bags for recycling via a personal rotary blade shredder in accordance with an embodiment of the present disclosure.

FIG. 9 depicts a method of preparing plastic bottles and bags for recycling via a personal rotary blade shredder in accordance with an embodiment of the present disclosure. The method includes providing M a stationary disc configured to define an opening for a plastic consumer recyclable to pass there through, the stationary disc configured with cutting teeth disposed on an axial surface of the stationary disc. The method also includes spinning N a disc configured with cutting teeth disposed on a axial surface thereof facing the cutting teeth of the stationary disc, the spinning disc oriented orthogonally to a passage of the plastic consumer recyclable through the stationary disc onto the spinning disk. The method further includes creating O shreds of the plastic consumer recyclable passing through the stationary disc to the spinning disc separated by a space configured for shredding via the respective cutting teeth for shreds to pass there through.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A shredder, comprising:
a hinged lid;
a stationary disc configured with cutting teeth disposed on an axial surface thereof and disposed orthogonal to an underside of the hinged lid;
a spinning disc configured with cutting teeth disposed on a axial surface thereof, the spinning disc disposed on a sidewall of the shredder; and
a ramp for directing plastic to the stationary disc,
wherein the stationary disc and the spinning disc are put into a parallel position based on the hinged lid swung shut and into a sandwich configuration separated by a space configured to accommodate the respective cutting teeth thereof.

2. The device of claim 1, wherein the stationary disc is disposed on the hinged lid of the device and the spinning disc is disposed on the sidewall of the shredder such that a closure of the hinged lid puts the stationary and spinning discs in immediate proximity to each other.

3. The shredder of claim 1, wherein the cutting teeth of the stationary disc are offset from the cutting teeth of the spinning disc in order to produce shreds of cut plastic.

4. The shredder of claim 1, wherein the cutting teeth of the spinning disc and the cutting teeth of the stationary disc both comprise cutting blades in the shape of a parrot's beak comprising a rhinotheca tomium cutting surface.

5. The shredder of claim 1, wherein a cutting edge of the cutting teeth of both the spinning disc and the stationary disc face each other.

6. The shredder of claim 1, wherein a rhinotheca tomium cutting surface of the spinning disc faces a direction of rotation of the spinning disc.

7. The shredder of claim 1, further comprising a 110 volt electric motor configured to torque the spinning disc at a variable revolutions per minute choosen by a user of the device.

\* \* \* \* \*